(12) United States Patent
Donehue

(10) Patent No.: US 6,435,026 B1
(45) Date of Patent: Aug. 20, 2002

(54) LIQUID LEVEL INDICATOR

(76) Inventor: Wade L. Donehue, P.O. Box 705, League City, TX (US) 77573

( * ) Notice: Subject to any disclaimer, the term of this patent is extended or adjusted under 35 U.S.C. 154(b) by 0 days.

(21) Appl. No.: 09/495,139

(22) Filed: Jan. 31, 2000

Related U.S. Application Data

(62) Division of application No. 09/066,173, filed on Apr. 24, 1998, now abandoned.

(51) Int. Cl.⁷ ............................................... G01F 23/00
(52) U.S. Cl. ......................... 73/314; 73/319; 73/DIG. 5
(58) Field of Search ........................ 73/314, 319, 326, 73/328, DIG. 5

(56) References Cited

U.S. PATENT DOCUMENTS

| | | | |
|---|---|---|---|
| 1,242,176 A | * | 10/1917 | Gross ........................ 73/326 |
| 2,762,778 A | * | 9/1956 | Gorter ........................ 252/62.5 |
| 3,420,103 A | * | 1/1969 | Peschek ........................ 73/319 |
| 4,512,190 A | * | 4/1985 | Sledmere ........................ 73/319 |

* cited by examiner

Primary Examiner—Daniel S. Larkin
(74) Attorney, Agent, or Firm—John R Casperson

(57) ABSTRACT

A magnetically operated liquid level indicator of the kind having a magnetized float which moves as the level of liquid changes is disclosed. The indicator has a plurality of magnetized indicator elements disposed one above the other and past which the magnetized float travels as the liquid level rises or falls. The indicator elements are rotatable under the influence of the magnetized float. Weakly magnetized, closely spaced, long, one-piece ceramic magnets are employed as the indicator elements.

5 Claims, 3 Drawing Sheets

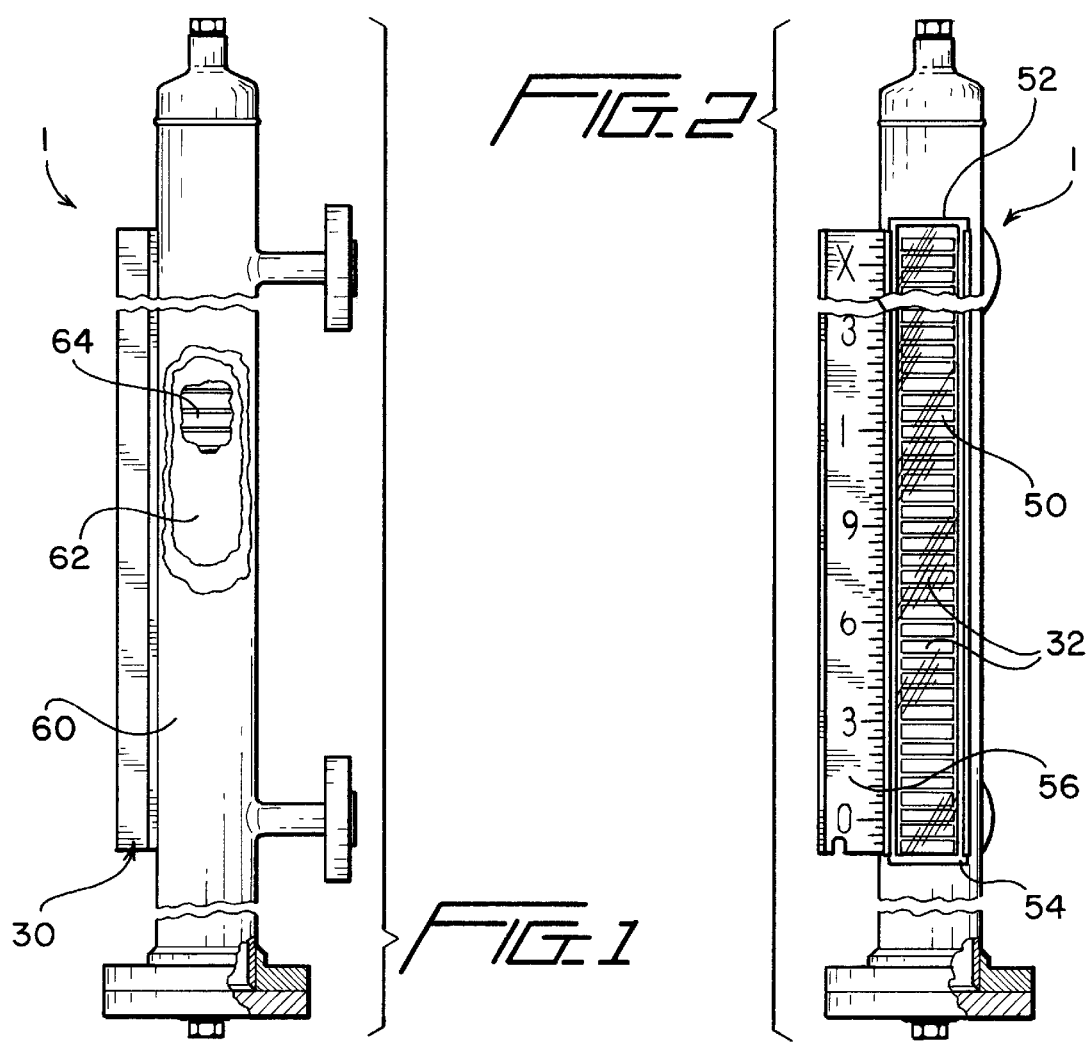
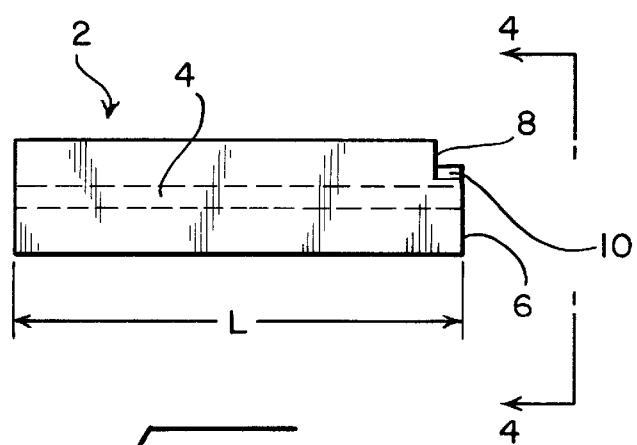
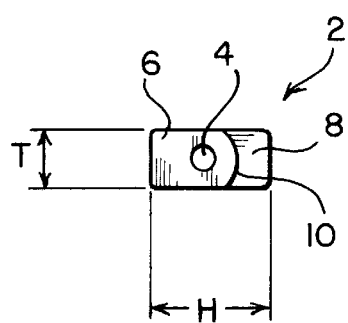

LIQUID LEVEL INDICATOR

This application is a divisional of application Ser. No. 09/066,173 filed Apr. 24, 1998, now abandoned and claims the benefit of such earlier filing date.

BACKGROUND OF THE INVENTION

In one aspect, this invention relates to a magnetically operated liquid level indicator of the kind having a magnetized float which moves as the level of liquid changes, and having a plurality of magnetized indicator elements disposed one above the other and past which the magnetized float travels as the liquid level rises or falls, the indicator elements being rotatable under the influence of the magnetized float.

One of the shortcomings of prior art level indicators of this type is an upper practical limit to the size of the indicator elements. Once the indicators reach a certain size, the magnetic attraction between them is difficult to overcome with the float. Prior art indicators have often been limited to an indicator width of about one inch. Where the level indicator is disposed far above ground level, it is difficult to read the level indicated by such small indicator elements from the ground. A liquid level indicator which has wide indicator elements would be very desirable.

Another shortcoming of prior art indicators is a practical upper limit to operating temperature. Where the indicator is used to measure the liquid level of hot fluids, exposure to excessively hot temperatures can lead to degaussing of the indicator elements, and malfunctions of the level indicator. As many refining, chemical and petrochemical processes operate at fluid temperatures of up to 1100 degrees Fahrenheit, a liquid level indicator which does not malfunction after exposure to such temperatures would also be desirable.

Other prior art indicators have used a multi piece indicator element construction in an attempt to overcome the strong attraction between long magnetic indicator elements, such as by using a small magnet in a longer non-magnetic flag. However, multi piece indicator elements are expensive to fabricate, and are also subject to corrosion where dissimilar materials have been used. An indicator element which is of unitary construction and is formed from a highly corrosion resistant material would further be very desirable.

OBJECTS OF THE INVENTION

It is an object of this invention to provide a liquid level indicator with long indicator elements which can be easily viewed from a distance.

It is another object of this invention to provide a liquid level indicator where the indicator elements are narrow and closely spaced, so that the indicated level can be determined with good resolution.

It is a further object of this invention to provide a liquid level indicator which is useful and reliable up to an operating temperature of 1100 degrees Fahrenheit.

It is a further object of this invention to provide a liquid level indicator which utilizes indicator elements which are of inexpensive unitary construction and are formed from a highly corrosion resistant material.

SUMMARY OF THE INVENTION

In one embodiment of the invention, there is provided an indicator flag which can be used in a liquid level indicator of the magnetic type. The indicator flag is longitudinally elongated and is formed from a magnetizable composite material. The flag has a first end, a second end, a longitudinal axis, and a generally rectangular cross section transverse to the longitudinal axis. A borehole extends along the longitudinal axis of the flag from the first end to the second end. The first end of the flag defines a generally planar first end surface first portion onto which the borehole opens and a generally planar first end surface second portion which is longitudinally spaced from the first portion surface. A generally cylindrical first end surface third portion is radiused around the borehole and connects the first portion and the second portion. The borehole permits the flag to be rotatably mounted to a mounting pin, which lessens the risk of binding. The radius permits the flag to be sufficiently closely mounted to a rotation stop so that the flag faces are near vertically positioned adjacent to the stop, without the flag binding against the stop as it rotates. The second end surface permits the flag to rotate past a rotation stop.

In another embodiment of the invention, a liquid level indicator is formed from a frame, a plurality of parallel pins, and a plurality of magnetic slats, which are preferably in the form of the just described flags.

The frame is longitudinally elongated and channel shaped and is formed of a nonmagnetic material. The frame is defined by a first sidewall, a second sidewall parallel to the first sidewall, and a bottom wall connecting a bottom end of the first sidewall with a bottom end of the second sidewall. The frame has a longitudinal axis.

The plurality of parallel pins extends from the first sidewall to the second sidewall. The parallel pins are positioned parallel to the bottom wall and are longitudinally spaced apart from each other and the bottom wall. The pins extend normally to the longitudinal axis of the frame.

The plurality of magnetic slats is mounted to the parallel pins, one slat per pin. Each magnetic slat has a thickness, a height which is greater than the thickness, and a length which is greater than the height, and is positioned on a pin with its length extending parallel to the pin for pivoting movement around the pin. Normally, the height of each slat extends parallel to the longitudinal axis of the frame. Each slat has a magnetic axis parallel to its height, a first face having a first color, and an opposite second face having a second color which is optically discernable from the first face. Each slat has a length which is at least three times its height to facilitate viewing of the slat face.

The parallel pins are spaced apart a first distance which is slightly greater than the height of the slats, so that adjacent slats are aligned with each other in an edge to edge relationship due to mutual magnetic attraction and have sufficient clearance therebetween to permit each slat to pivot without mechanical interference from adjacent slats.

In another embodiment of the invention, there is provided a process for magnetizing pieces of magnetizable bar stock having a rectangular cross section. To carry out the process, a passage of rectangular cross section is formed in a mass of magnetically permeable material. The mass is positioned between a pair of magnetizing poles with the passage extending normally to an axis drawn between the poles. Pieces of bar stock having a rectangular cross section closely corresponding to the rectangular cross section of the passage are passed through the passage, under conditioned so that the magnetizing poles exert sufficient magnetizing force to magnetize the pieces of bar stock. Each piece of bar stock has a thickness, a height which is greater than the thickness, and a length which is greater than its height, and is passed through the passage so as to induce magnetism in a direction parallel to its height in an amount which in the range of from about 5% to about 50% of a saturation limit of the magnetizable material.

Magnetizing the flags to beneath the saturation limit makes feasible the use of closely spaced, long one-piece ceramic magnets as the indicator flags. Were the ceramic magnets fully magnetized, as taught by the prior art, the attractive forces between the long indicator flags would be too strong to be overcome by the magnetized float. The weakly magnetized magnets can also be subjected to temperatures which would cause degaussing of fully magnetized indicator flags without loss of function.

BRIEF DESCRIPTION OF THE DRAWINGS

FIG. 1 is a side view of a level indicator in accordance with certain aspects of the invention, partly in schematic, partly in cross section, and partly broken away to show internal details.

FIG. 2 is a front view of the level indicator shown in FIG. 1.

FIG. 3 is a plan view of an indicator flag useful in the level indicator shown in FIG. 1.

FIG. 4 is an end view of the indicator flag shown in FIG. 3 when viewed along lines 4—4.

DETAILED DESCRIPTION OF THE INVENTION

Figure 5:
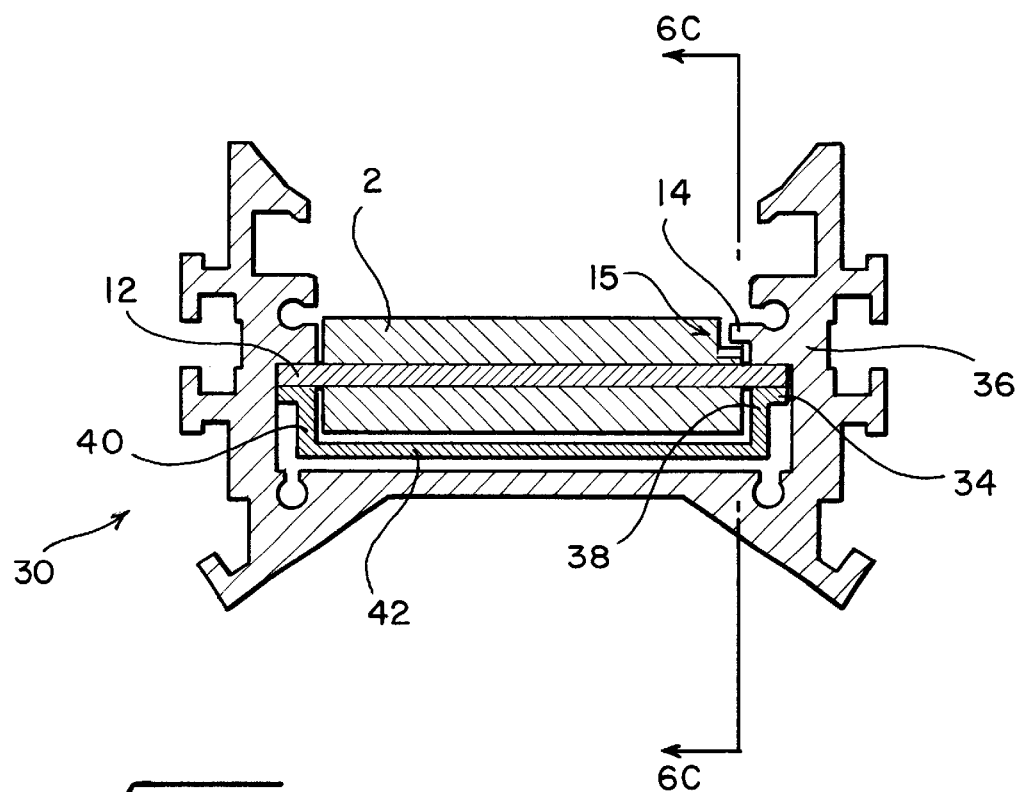
FIG. 5 is a cross sectional view of a portion of the level indicator shown in FIG. 1.
Figure 7:
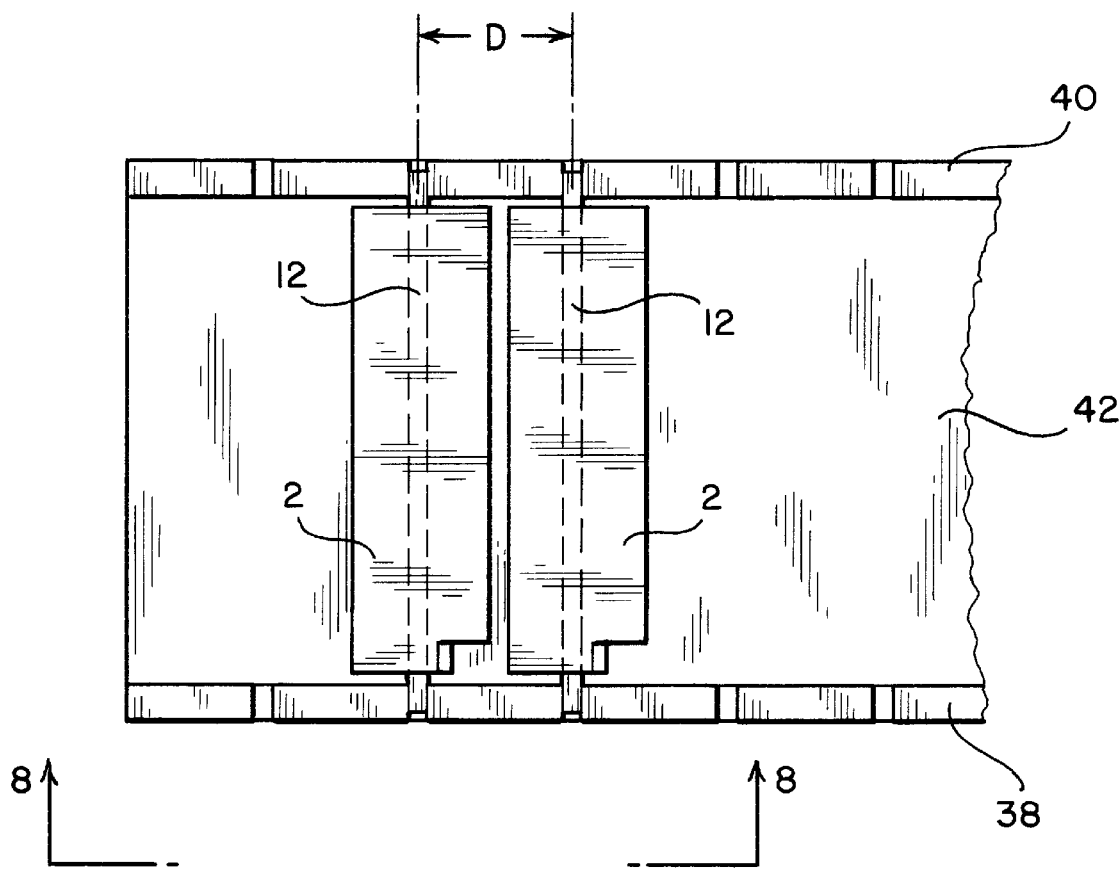
FIG. 7 is a top view of a portion of the device shown in FIG. 5.
Figure 8:
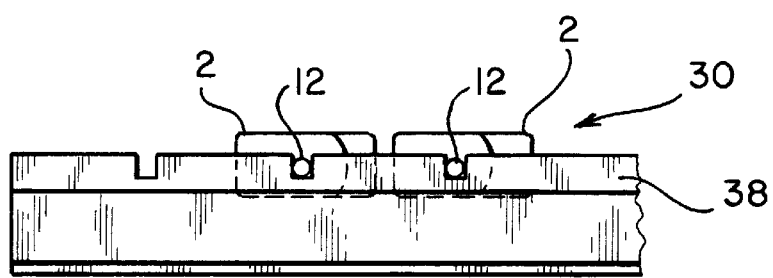
FIG. 8 is a side view the items shown in FIG. 7 when viewed along lines 8—8.

With reference to FIGS. 3 and 4, there is provided an indicator flag 2 which can be used in a liquid level indicator of the magnetic type, such as that shown in FIGS. 1 and 2. The indicator flag is longitudinally elongated and is formed from a magnetizable composite material. The flag 2 has a first end, a second end, a longitudinal axis, and a generally rectangular cross section transverse to the longitudinal axis. A borehole 4 extends along the longitudinal axis of the flag from the first end to the second end. The first end of the flag defines a generally planar first end surface first portion 6 onto which the borehole opens and a generally planar first end surface second portion 8 which is longitudinally spaced from the first portion surface. A generally cylindrical first end surface third portion 10 is radiused around the borehole 4 and connects the first portion 6 and the second portion 8. The borehole permits the flag to be rotatably mounted to a mounting pin (item 12, see FIG. 7), which lessens the risk of binding. The radius permits the flag to be sufficiently closely mounted to a rotation stop (item 14, see FIG. 5) so that the flag faces are vertically positioned adjacent to the stop, without the flag binding against the stop as it rotates. The second end surface forms a cutout to permit the flag to rotate past the rotation stop.

Figures 6A, 6B, 6C, 6D, 6E:
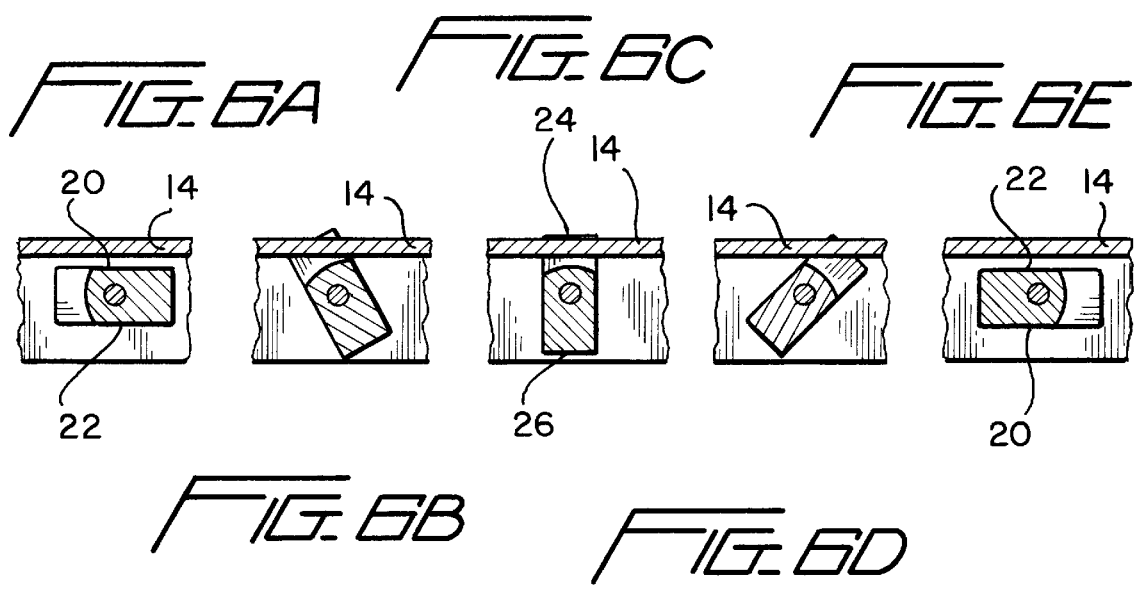
FIGS. 6A through 6E illustrate an operation sequence of the level indicator shown in FIG. 1, with FIG. 6C corresponding to a cross sectional view along lines 6C—6C shown in FIG. 5.

Generally speaking, the indicator flag is described as having a height, a thickness, and a length. The height is in the range of 1.5 to 5 times the thickness and the length is in the range of 3 to 10 times the height. See "L", "H" and "T" as indicated in FIGS. 3 and 4. With reference to FIGS. 6A through 6C, the flag is generally box-shaped and has a front surface 20, an oppositely facing back surface 22, a top surface 24, and an oppositely facing bottom surface 26. The area of the top surface is typically in the range of from about 1 to about 5 square centimeters.

The flag can be generally described as being formed from a magnetizable ceramic material which has been magnetized in an amount of between about 5% and about 50% of a saturation limit for such ceramic material. Usually, the flag will be magnetized in an amount of between about 10% and 20% of the saturation limit for the material. Preferred ceramic materials for employment in the invention are selected from the group consisting of $BaFe_2O_3$ and $SrFe_2O_3$ The saturation limit for these materials is generally in the range of from about 400 to about 1200 Gauss, typically about 700 Gauss, and the indicators formed therefrom will generally have a flux density in the range of from about 20 to about 200 Gauss, typically about 100 Gauss. The desired amount of magnetism can be imparted to the indicator by exposing it to a magnetizing field of less than 1,000 Oersteds.

In another embodiment of the invention, there is provided a process for magnetizing pieces of magnetizable bar stock having a rectangular cross section. To carry out the process, a passage of rectangular cross section is formed in a mass of magnetically permeable material. The mass is positioned between a pair of magnetizing poles with the passage extending normally to an axis drawn between the poles. Pieces of bar stock having a rectangular cross section closely corresponding to the rectangular cross section of the passage are passed through the passage, under conditioned so that the magnetizing poles exert sufficient magnetizing force to magnetize the pieces of bar stock. Each piece of bar stock has a thickness, a height which is greater than the thickness, and a length which is greater than its height, and is passed through the passage so as to induce magnetism in a direction parallel to its height in an amount which in the range of from about 5% to about 50% of a saturation limit of the magnetizable material.

The mass of magnetically permeable material is preferably selected from the group consisting of wood and polymer. The magnetic material is preferably a ceramic material, and is more preferably selected from the group consisting of $BaFe_2O_3$ and $SrFe_2O_3$. The magnetic poles preferably form a portion of a DC magnetizer and the magnetizing force exerted on the bar stock is preferably in the range of from about 100 to about 1,000 Oersteds.

In another embodiment of the invention, a liquid level indicator 1 (see FIGS. 1 and 2) is formed from a frame means 30, a plurality of parallel pins, and a plurality 32 of magnetic slats, which are preferably in the form of the just described flags.

The frame means 30 is longitudinally elongated and channel shaped and is formed of a nonmagnetic material. The frame has a longitudinal axis. In the embodiment illustrated in FIG. 5, the frame means 30 is formed by a carrier tray 34 and a housing 36. The frame means includes a first sidewall 38, a second sidewall 40 parallel to the first sidewall, and a bottom wall 42 connecting a bottom end of the first sidewall with a bottom end of the second sidewall.

The plurality of parallel pins 12 extends from the first sidewall to the second sidewall. The parallel pins are positioned parallel to the bottom wall and are longitudinally spaced apart from each other and the bottom wall. The pins extend normally to the longitudinal axis of the frame.

The plurality of magnetic slats or flags 2 is mounted to the parallel pins, one slat per pin. Each magnetic slat has a thickness, a height which is greater than the thickness, and a length which is greater than the height, and is positioned on a pin with its length extending parallel to the pin for pivoting movement around the pin. Normally, the height of the slat extends parallel to the longitudinal axis of the frame. Each slat has a magnetic axis parallel to its height, a first face 20 having a first color, and an opposite second face 22 having a second color which is optically discernable from the first face. Each slat has a length which is at least three times its height to facilitate viewing of the slat face.

The parallel pins are spaced apart a first distance which is slightly greater than the height of the slats (see "D", FIG. 7), so that adjacent slats are aligned with each other in an edge to edge relationship due to mutual magnetic attraction and have sufficient clearance therebetween to permit each slat to pivot without mechanical interference from adjacent slats.

Preferably, each slat is formed from a ceramic magnetic material which has been magnetized in an amount well beneath a saturation limit of the material. Preferably, each slat has a flux density in the range of from about 20 to about 200 Gauss. Because larger masses exert stronger forces, the volume of the slat is preferably maintained beneath an upper limit. Preferably, each slat has a volume in the range of from about 1 to about 5 cubic centimeters. Preferred slats have a thickness in the range of from about 0.4 cm to about 1 cm and a length in the range of from about 3 cm to about 10 cm.

To reduce the chance for rotation of the slats being affected by binding, each parallel pin is preferably rotatably mounted in the frame. Each slat is preferably rotatably mounted to a pin. Forming the slat from ceramic and the pin from stainless steel is preferred because it will reduce the change for binding caused by corrosion. The chamber containing the slats and pins is also preferably sealed and filled with inert gas to reduce the chance for corrosion damage.

It is necessary to prevent the slats from overrotating as the device is used. To achieve this end, each slat preferably has a first end, a second end, an axial passage extending between the first end and the second end. A first edge surface connects the first face and the second face. An opposite second edge surface connects the first face and the second face. A cutout 15 is defined at the first end of each slat between the axial passage and the first edge surface. A longitudinally elongated ridge 14 protrudes from the first side wall towards the second side wall positioned alongside the plurality of pins. The cutout in each slat permits each slat to pivot from a first position wherein the first face of the slat is adjacent to the longitudinally elongated ridge (See FIG. 6A) to a second position wherein the second face of the slat is adjacent to the longitudinally elongated ridge (See FIG. 6E).

Preferably, the ridge 14 is positioned at a distance of slightly more than about one half of the thickness of the slat from a centerline of the pins, and each cutout is defined by a longitudinally facing end surface and a generally cylindrical surface facing radially outwardly with respect to the passage. The generally cylindrical surface has a radius of about one-half of the thickness of the slat. This geometry permits the slat faces to be nearly vertically positioned adjacent the ridge when the device is in use.

In a further preferred embodiment, the indicator further comprises a transparent cover 50 (see FIG. 2), a first end closure 52, a second end closure 54, and a measurement device 56. The cover extends between the first side wall and the second side wall. A chamber is defined between the transparent cover, the first side wall, the second side wall, and the bottom wall. The slats are positioned in the chamber. The first end closure is positioned at an upper end of the chamber. The second end closure is positioned at a lower end of the chamber. The measurement device is positioned alongside the chamber.

In a further preferred embodiment, the level indicator further comprises a tube 60, a float 62, and a magnet 64. The float is positioned within the tube. The magnet is positioned within the float, and the liquid level indicator 1 is mounted to the tube 60 so that the slats are pivotable by the action of the magnet in the float.

While certain preferred embodiments of the invention have been described herein, the invention is not to be construed as being so limited, except to the extent that such limitations are found in the claims.

What is claimed is:

1. A longitudinally elongated indicator flag formed from a magnetized ceramic composite material selected from the group consisting of $BaFe_2O_3$ and $SrFe_2O_3$ having a flux density in the range of from about 20 to about 200 Gauss and a saturation limit in the range of from about 400 to about 1200 Gauss, said longitudinally elongated indicator flag having a first end, a second end, a longitudinal axis, a generally rectangular cross section transverse to the longitudinal axis, and defining a borehole extending along its longitudinal axis from the first end to the second end, wherein the first end of the indicator flag defines a generally planar first end surface first portion onto which the borehole opens and a generally planar first end surface second portion which is longitudinally spaced from the first portion surface, and a generally cylindrical first end surface third portion which is radiused around the borehole and connects the first portion and the second portion.

2. A longitudinally elongated indicator flag as in claim 1 having a height, a thickness, and a length, wherein the height is in the range of 1.5 to 5 times the thickness, the length is in the range of 3 to 10 times the height, and the generally cylindrical first end surface third portion is radiused around the borehole with a radius which is about one-half of the thickness of the elongated indicator flag.

3. A longitudinally elongated indicator flag as in claim 2 which has a front surface, an oppositely facing back surface, a top surface, and an oppositely facing bottom surface, and the area of the top surface is in the range of from about 1 to about 5 square centimeters, in combination with a longitudinally elongated channel shaped frame formed of a nonmagnetic material and defined by a first sidewall, a second sidewall parallel to the first sidewall, and a bottom wall connecting a bottom end of the first sidewall with a bottom end of the second sidewall, said elongated channel shaped frame having a longitudinal axis; and a plurality of parallel pins extending from the first sidewall to the second sidewall, said parallel pins being positioned parallel to the bottom wall and longitudinally spaced apart from each other and the bottom wall and extending normally to the longitudinal axis of the frame;

wherein a plurality of said longitudinally elongated indicator flags are mounted to the parallel pins, one indicator flag per pin, the pin extending through the borehole for pivoting movement of the indicator flag around the pin, each of the plurality of longitudinally elongated indicator flags having a magnetic axis parallel to its height, wherein the front surface of each indicator flag has a first color, and the back surface of each indicator flag has a second color which is optically discernable from the front surface, each indicator flag being of unitary construction, and wherein the plurality of parallel pins are spaced apart a first distance which is slightly greater than the height of the longitudinally elongated indicator flags, so that adjacent indicator flags are aligned with each other in an edge to edge relationship due to mutual magnetic attraction and have sufficient clearance therebetween to permit each indicator flag to pivot without mechanical interference from adjacent indicator flags.

4. A longitudinally elongated indicator flag as in claim 3 which is formed from a magnetizable ceramic material which has been magnetized in an amount of between about 5% and about 50% of a saturation limit for such ceramic material.

5. A longitudinally elongated indicator flag as in claim 3 which is formed from a magnetizable ceramic material which has been magnetized by exposure to a magnetizing field of less than 1,000 Oersteds.

* * * * *